US009761030B2

(12) United States Patent
Xu et al.

(10) Patent No.: US 9,761,030 B2
(45) Date of Patent: Sep. 12, 2017

(54) SCENE IMAGE GENERATOR (71) Applicant: EMPIRE TECHNOLOGY DEVELOPMENT LLC, Wilmington, DE (US)

(72) Inventors: Shijie Xu, Haidian District (CN); Jie Chen, Xicheng District (CN); Qi Li, Haidian District (CN); Xuefeng Song, Shijiazhuang (CN)

(73) Assignee: EMPIRE TECHNOLOGY DEVELOPMENT LLC, Wilmington, CT (US)

( * ) Notice: Subject to any disclaimer, the term of this patent is extended or adjusted under 35 U.S.C. 154(b) by 0 days.

(21) Appl. No.: 14/767,165

(22) PCT Filed: Oct. 10, 2014

(86) PCT No.: PCT/CN2014/088281
§ 371 (c)(1),
(2) Date: Aug. 11, 2015

(87) PCT Pub. No.: WO2016/054800
PCT Pub. Date: Apr. 14, 2016

(65) Prior Publication Data
US 2016/0253832 A1 Sep. 1, 2016

(51) Int. Cl.
*G06T 11/60* (2006.01)
*G06T 1/00* (2006.01)
(Continued)

(52) U.S. Cl.
CPC .............. *G06T 11/60* (2013.01); *A63F 13/34* (2014.09); *A63F 13/355* (2014.09); *A63F 13/52* (2014.09); *G06T 1/0007* (2013.01)

(58) Field of Classification Search
CPC ................ G06K 9/00771; G06T 13/80; G06T 2207/10016; G06T 15/00; G06F 17/30271
See application file for complete search history.

(56) References Cited

U.S. PATENT DOCUMENTS 6,111,581 A   8/2000 Berry et al.
8,698,828 B2  4/2014 Plowman et al.
(Continued)

FOREIGN PATENT DOCUMENTS

CN  101620724 A  1/2010
CN  102903146 A  1/2013
(Continued)

OTHER PUBLICATIONS

International Search Report and Written Opinion for International Application No. PCT/CN2014/088281 mailed Jul. 10, 2015, 8 pages.

*Primary Examiner* — Sing-Wai Wu
(74) *Attorney, Agent, or Firm* — Moritt Hock & Hamroff LLP; Steven S. Rubin, Esq.

(57) ABSTRACT

Technologies are generally described for methods and systems effective to generate a scene image. In an example, a processor may receive a first rendered object from a first device and may further store the first rendered object in a memory. The first rendered object may be based on object data and may include first attribute data of the object data. The processor may further receive a request from a second device to generate the scene image. The scene image may include an object image of a second rendered object that may be based on the object data and may include second attribute data of the object data. The processor may further compare the second attribute data with the first attribute data to determine a match value. The processor may further determine whether to select the stored first rendered object to generate a scene image based on the match value.

16 Claims, 6 Drawing Sheets (51) Int. Cl.
      *A63F 13/52*       (2014.01)
      *A63F 13/355*      (2014.01)
      *A63F 13/34*       (2014.01)

(56) References Cited

U.S. PATENT DOCUMENTS

| | | | |
|---|---|---|---|
| 2009/0232214 A1* | 9/2009 | Ghanbari | H04N 19/577 375/240.16 |
| 2014/0085314 A1 | 3/2014 | Steinke | |
| 2014/0229324 A1* | 8/2014 | Gudorf | G06Q 30/0282 705/26.7 |

FOREIGN PATENT DOCUMENTS

| | | |
|---|---|---|
| CN | 102999680 A | 3/2013 |
| WO | 2012158836 A2 | 11/2012 |

\* cited by examiner

500 A computer program product.

502 A signal bearing medium.

504
At least one of
One or more instructions to generate a scene image; or
One or more instructions for receiving a first rendered object from a first device, wherein the first rendered object is based on object data, and the first rendered object includes first attribute data of the object data; or
One or more instructions for storing the first rendered object and the object data in a memory configured to be in communication with the processor; or
One or more instructions for receiving a request from a second device to generate the scene image, wherein the scene image includes an object image of a second rendered object, wherein the second rendered object is based on the object data, and the second rendered object includes second attribute data of the object data; or
One or more instructions for comparing the second attribute data with the first attribute data to determine a match value; or
One or more instructions for determining whether to select the stored first rendered object or the stored object data to generate the scene image, wherein the determination of whether to select is based on the match value.

| 506 A computer readable medium | 508 A recordable medium | 510 A communications medium |

Fig. 5

SCENE IMAGE GENERATOR

CROSS-REFERENCE TO RELATED APPLICATION

This application is the U.S. National Stage filing under 35 U.S.C. §371 of International Application No. PCT/CN2014/088281, filed on Oct. 10, 2014. The disclosure of the International Application is hereby incorporated herein by reference in its entirety.

BACKGROUND

Unless otherwise indicated herein, the materials described in this section are not prior art to the claims in this application and are not admitted to be prior art by inclusion in this section.

An application, such as a video game, may include object data that may be associated with object images, such as a character or a weapon, displayable on a display. The application may further be effective to generate one or more scene images, where each scene image may be based on scene data. Scene data may be a composition of rendered objects and may be displayable as a scene image. In an example, a processor may generate a rendered object based on object data and attributes of the object data.

SUMMARY

In some examples, methods to generate a scene image are generally described. The methods may include receiving, by a processor, a first rendered object from a first device. The first rendered object may be based on object data, and may include first attribute data of the object data. The methods may also include storing, by the processor, the first rendered object and the object data in a memory. The memory may be configured to be in communication with the processor. The methods may also include receiving, by the processor, a request from a second device to generate the scene image. The scene image may include an object image of a second rendered object. The second rendered object may be based on the object data, and may include second attribute data of the object data. The methods may also include comparing, by the processor, the second attribute data with the first attribute data to determine a match value. The methods may also include determining, by the processor, whether to select the stored first rendered object or the stored object data to generate the scene image. The determination of whether to select may be based on the match value.

In some examples, systems effective to generate a scene image are generally described. The systems may include a memory. The memory may be configured to store an instruction. The systems may also include a processor. The processor may be configured to be in communication with the memory. The processor may be configured to receive a first rendered object from a first device. The first rendered object may be based on object data, and may include first attribute data of the object data. The processor may be further configured to store the first rendered object and the object data in the memory. The processor may be further configured to receive a request from a second device to generate the scene image. The scene image may include an object image of a second rendered object. The second rendered object may be based on the object data, and may include second attribute data of the object data. In response to receipt of the second request, the processor may execute the instruction stored in the memory to compare the second attribute data with the first attribute data. The processor may also execute the instruction to determine a match value between the first and second attribute based on the comparison. The processor may also execute the instruction to determine whether to select the stored first rendered object or the stored object data to generate the scene image. The determination of whether to select may be based on the match value.

In some examples, systems effective to generate a scene image are generally described. The systems may include a memory. The memory may be configured to store an instruction. The systems may include a first processor and a second processor. The first processor may be configured to be in communication with the memory. The first processor may be configured to generate a first rendered object. The first rendered object may be based on object data, and may include first attribute data of the object data. The first processor may also be configured to store the first rendered object and the object data in the memory. The second processor may be configured to be in communication with the memory and the first processor. The second processor may be configured to receive a request from a device to generate the scene image. The scene image may include an object image of a second rendered object. The second rendered object may be based on the object data, and may include second attribute data of the object data. In response to receipt of the second request, the second processor may execute the instruction stored in the memory to compare the second attribute data with the first attribute data. The second processor may also execute the instruction to determine a match value between the first and second attribute based on the comparison. The second processor may also be configured to execute the instruction to determine whether to select the stored first rendered object or the stored object data to generate the scene image. The determination of whether to select may be based on the match value.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to generation of a scene image.

Briefly stated, technologies are generally described for methods and systems effective to generate a scene image. In an example, a processor may receive first rendered object from a first device and may further store the first rendered object in a memory. The first rendered object may be based on object data and may include first attribute data of the object data. For example, the first rendered object may be a character of a first size, where the object data may be a model of the character, and where the first attribute data may be effective to indicate the first size. The processor may further receive a request from a second device to generate the scene image. The scene image may include an object image of a second rendered object that may be based on the object data and may include second attribute data of the object data. For example, the scene image may include an object image of the same character but of a second size different from the first size. The processor may further compare the second attribute data with the first attribute data to determine a match value. For example, the processor may compare the first size with the second size. The processor may further determine whether to select the stored first rendered object to generate a scene image based on the match value. For example, if the match value indicates that the first size matches the second size, the processor may select the first rendered object to be used in generation of the scene image, instead of generating the second rendered object to generate the scene image.

Figure 1:
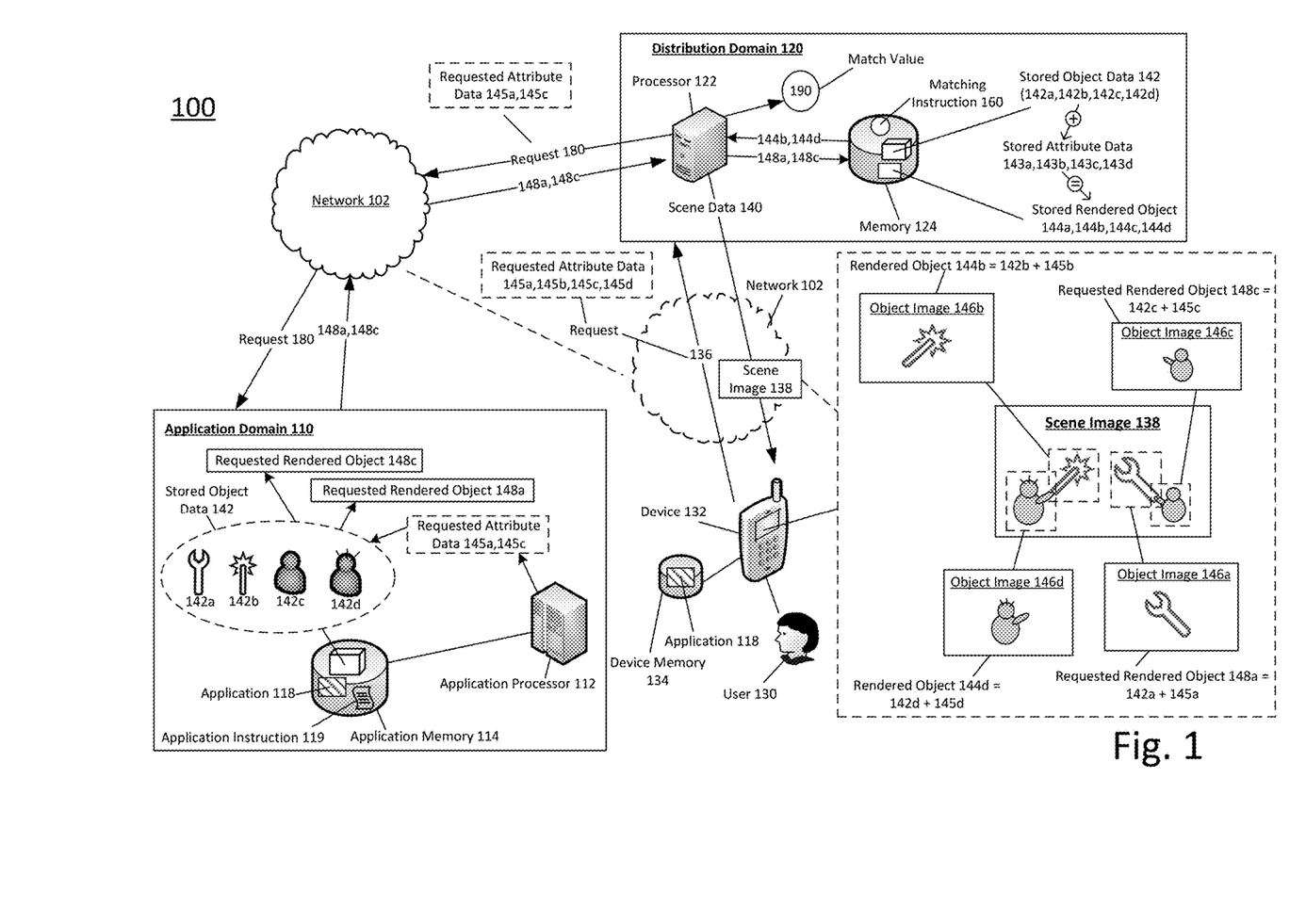
FIG. 1 illustrates an example system that can be utilized to implement a scene image generator.

FIG. 1 illustrates an example system 100 that can be utilized to implement a scene image generator, arranged in accordance with at least some embodiments described herein. As will be described in more detail below, system 100 may be implemented with a distribution domain 120 to determine how to generate a scene image 138. System 100 may be implemented to generate scene image 138 by generating requested rendered objects, and/or by retrieving rendered objects which may be saved in a memory. Distribution domain 120 may include a memory 124 configured to receive and save stored rendered objects 144 (including stored rendered objects 144a, 144b, 144c, 144d). Stored rendered objects 144 may be rendered objects which are generated based on stored object data 142 (including stored object data 142a, 142b, 142c, 142d) of an application 118 such as, for example, a video game. An example of stored object data 142 may be data effective to represent an object or a model, such as a three-dimensional model of a character of a video game. Stored rendered objects 144 may include stored attribute data 143 (including stored attribute data 143a, 143b, 143c, 143d) of objects represented by stored object data 142. Attribute data 143 may be effective to describe one or more attributes of objects represented by stored object data 142, such as, for example, an identification, a size, etc., of objects represented by stored object data 142. For example, stored rendered object 144d may include stored attribute data 143d of stored object data 142d, where stored attribute data 143d may indicate a size of an object represented by stored object data 142d in stored rendered object 144d. Stored rendered objects 144a, 144b, 144c, 144d, and stored object data 142a, 142b, 142c, 142d may be stored in memory 124.

Distribution domain 120 may receive a request 136 to generate a scene image 138, where scene image 138 may include object images 146 (including object image 146a, 146b, 146c, 146d) of requested rendered objects 148. In some examples, request 136 may include identifications of stored object data 142 and may include indications of requested attribute data 145 (including requested attribute data 145a, 145b, 145c, 145d). In some examples, request 136 may include requests for objects of application 118, and a processor 122 of distribution domain 120 may identify stored object data 142 that represents the requested objects. Generation of requested rendered objects 148 may be based on an application of requested attribute data 145 to stored object data 142 as is described below. A processor 122 of distribution domain 120 may compare requested attribute data 145 with stored attribute data 143 stored in memory 124 to determine a match value 190. Match value 190 may indicate whether requested attribute data 145 matches with stored attribute data 143. Processor 122 may further determine, based on match value 190, whether to select stored rendered objects 144 stored in memory 124, generate requested rendered objects 148, or request requested rendered objects 148 from application domain 110, based on match value 190. Based on the determination, processor 122 may generate scene image 138 with use of stored rendered objects 144 stored in memory 124, and/or based on requested rendered objects 148.

A user 130 may use a device 132 to execute application 118. Device 132 may be a cellular phone, a laptop computer, a video game console, etc., which may be configured to be in communication with distribution domain 120 through network 102. In some examples, distribution domain 120 may be associated with a content delivery network. Network 102 may be the Internet or may be a cellular network. Device 132 may include a device memory 134, which may be configured to store application 118. During execution of application 118 on device 132, device 132 may generate request 136 for a scene image 138 based on an input by user 130. For example, user 130 may use controls, such as buttons, of device 132 to input commands to generate request 136. In some examples, device 132 may generate request 136 based on the execution of application 118. For example, device 132 may generate request 136 when a scene image 138 is required to continue an execution of application 118. In some examples, request 136 may be a request to insert a particular rendered object into scene image 138. In an example where application 118 is a video game, an example scene image may be a stage, a dungeon, etc., of the video game. In the example where application 118 is a video game, an example rendered object may be a character, or a piece of equipment, etc., of the video game. In the example where application 118 is a video game, request 136 may be a request for a particular stage of the video game, or for an insertion of a character into a current scene image being displayed by device 132, etc.

Device 132 may send request 136 to distribution domain 120 through network 102. Distribution domain 120 may include processor 122 and/or memory 124, where processor 122 and memory 124 may be configured to be in communication with each other. Memory 124 may be configured to store one or more stored rendered objects 144, and stored object data 142. Memory 124 may be further configured to store a matching instruction 160, where matching instruction 160 may be effective to instruct processor 122 to compare requested attribute data 145 with stored attribute data 143. Matching instruction 160 may be further effective to instruct processor 122 to determine match value 190 based on the comparison. In the example, processor 122 of distribution domain 120 may receive request 136 and in response, may compare requested attribute data 145 with stored attribute data 143 to determine match value 190.

When match value 190 indicates a match between requested attribute data 145 and stored attribute data 143, processor 122 may retrieve stored rendered object 144, which is associated with stored attribute data 143, from memory 124, and may generate scene image 138 with use of stored rendered object 144. When match value 190 indicates that requested attribute data 145 does not match stored attribute data 143, processor 122 may apply requested attribute data 145 to stored object data 142, or apply requested attribute data 145 to stored rendered object 144, to generate requested rendered object 148 (described below). In some examples, when match value 190 indicates that requested attribute data 145 does not match stored attribute data 143, processor 122 may generate a request 180 to request application domain 110 to generate requested rendered object 148.

In an example, match value 190 may indicate that requested attribute data 145a, 145c, does not match with stored attribute data 143a, 143c. Processor 122 may generate request 180, where request 180 may include identifications of stored object data 142a, 142c, and may include indications of requested attribute data 145a, 145c. Processor 122 may send request 180 to application domain 110 to request a generation of requested rendered objects 148a, 148c based on requested attribute data 145a, 145c. An application processor 112 of application domain 110 may receive request 180, and in response, may analyze an application instruction 119 to determine whether to generate requested rendered objects 148a, 148c.

Application domain 110 may include application processor 112, and/or an application memory 114, configured to be in communication with each other. Application memory 114 may be configured to store application 118, application instruction 119, and/or stored object data 142. Application instruction 119 may be effective to instruct application processor 112 to apply attribute data, such as requested attribute data 145, to stored object data 142. Application processor 112 may generate requested rendered objects 148a, 148c, and may send requested rendered objects 148a, 148c to distribution domain 120 through network 102. Processor 122 may generate scene data 140 such as by a composition of stored rendered objects 144 and/or requested rendered objects 148. Processor 122 may generate scene image 138 based on scene data 140 and may send scene image 138 to device 132 to be displayed on a display of device 132. Processor 122 may then store requested rendered objects 148a, 148c in memory 124, which may be retrieved from processor 122 to generate a subsequent requested scene image that may include object images 146a, 146c of requested objects 148a, 148c.

Figure 2:
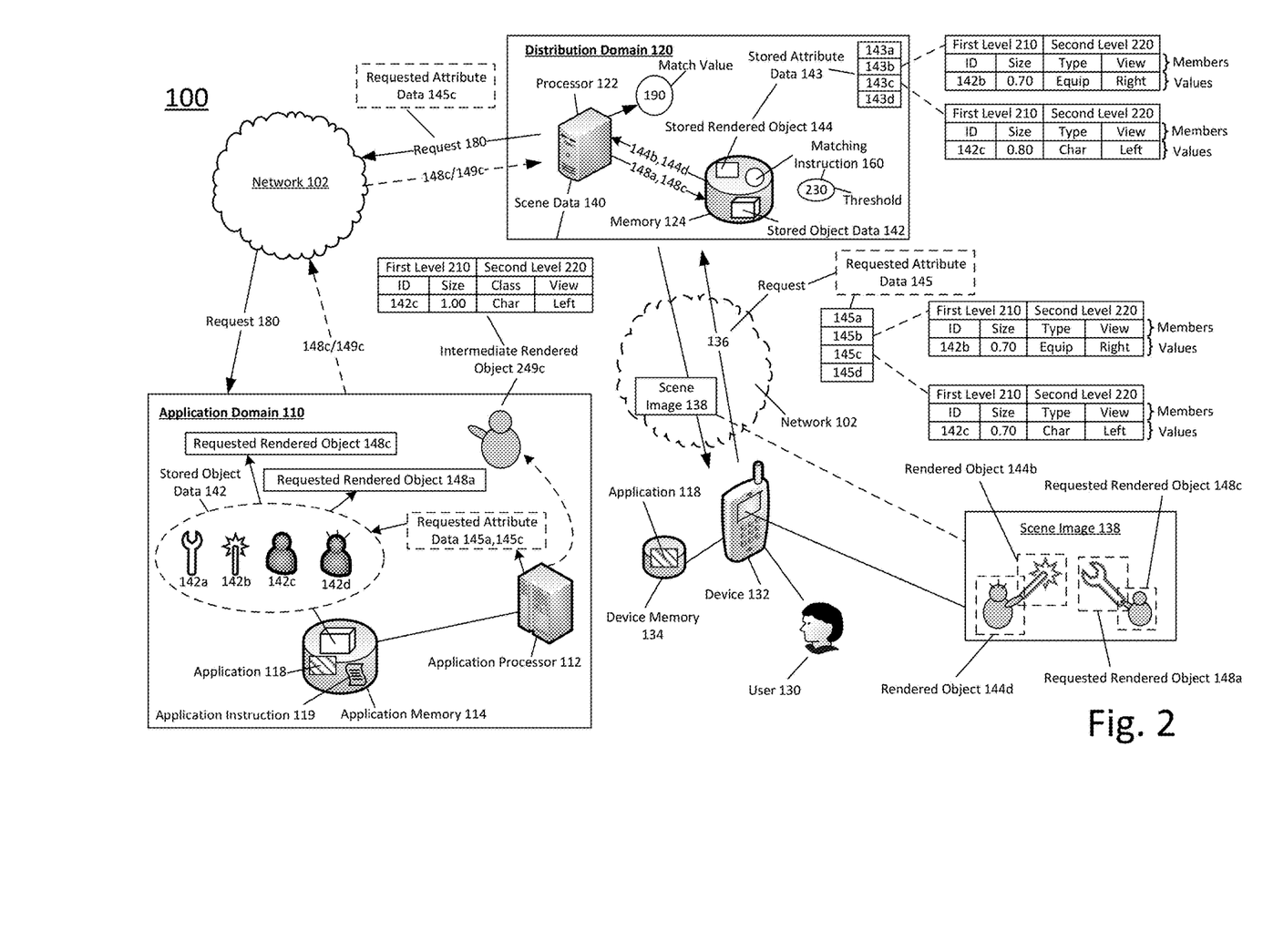
FIG. 2 illustrates the example system of FIG. 1 with additional detail relating to how a processor may be used to compare attribute data.

FIG. 2 illustrates the example system of FIG. 1 with additional detail relating to how a processor may be used to compare attribute data, arranged in accordance with at least some embodiments described herein. FIG. 2 is substantially similar to system 100 of FIG. 1, with additional details. Those components in FIG. 2 that are labeled identically to components of FIG. 1 will not be described again for the purposes of clarity.

Processor 122 may determine match value 190 based on the comparison of requested attribute data 145 with stored attribute data 143. Comparison of requested attribute data 145 with stored attribute data 143 may be based on at least a first level 210 and a second level 220 of requested attribute data 145 and/or stored attribute data 143. First level 210 and second level 220 may be attribute levels, where each attribute level may include one or more attribute members, where each member may include data effective to represent a particular attribute of objects represented by stored object data 142. In the example, first level 210 may include a member "ID" that may include data effective to represent an identification of objects represented by stored object data 142. First level 210 may further include a member "Size" that may include data effective to represent a size of objects represented by stored object data 142. Second level 220 may include a member "Type" that may include data effective to represent a type of objects represented by stored object data 142. Second level 220 may further include a member "View" that may include data effective to represent a perspective of objects represented by stored object data 142. For example, a value of member "Size" of requested attribute data 145a may be "0.70", which may indicate that requested rendered object 148a is of a size 70% of an original size of an object represented by stored object data 142a. Matching instruction 160 may be further effective to indicate a sequence to compare values of members and/or levels to facilitate comparison of requested attribute data 145 with stored attribute data 143. Processor 122 may determine match value 190 based on the comparison of values in one or more members and/or levels. Processor 122 may further compare match value 190 with a threshold 230 to determine whether to select stored rendered object 144, generate requested rendered object 148, or to request requested rendered object 148 from application domain 110, in order to generate scene image 138.

In the example, processor 122 of distribution domain 120 may receive request 136, which may include requested attribute data 145, from device 132. Processor 122 may compare requested attribute data 145 with stored attribute data 143 to determine match value 190. Processor 122 may compare each requested attribute data 145 with stored attribute data 143a, 143b, 143c, 143d. Focusing on an example comparison of requested attribute data 145b with stored attribute data 143a, 143b, 143c, 143d, processor 122 may determine that requested attribute data 145b has a best match with stored attribute data 143b. Processor 122 may determine that match value 190 for requested attribute data 145b is "100%" based on the same values of data in members of levels 210, 220 between requested attribute data 145b and stored attribute data 143b. Processor 122 may compare match value 190 of "100%" with threshold 230. In the example, threshold 230 may be "90%". Processor 122 may determine that match value 190 of "100%" is greater than threshold 230 of "90%", and in response, may retrieve stored rendered object 144b, which corresponds to stored attribute data 143b, from memory 124.

Focusing on an example comparison of requested attribute data 145c with stored attribute data 143a, 143b, 143c, 143d, processor 122 may determine that requested attribute data 145c has a best match with stored attribute data 143c. In an example, processor 122 may determine that match value 190 for requested attribute data 145c is "75%" based on a match of three values, out of four values, between members of requested attribute data 145c and stored attribute data 143c. In another example, processor 122 may determine that match value 190 for requested attribute data 145c is "87.5%" based on a comparison of unmatched members. For example, processor 122 may compare a value "0.70" of the member "Size" in requested attribute data 145c with a value "0.80" of the member "Size" in stored attribute data 143c to determine a ratio of "⅞", or "87.5%". Processor 122 may compare match value 190 of "87.5%" with threshold 230, which may be "90%". Processor 122 may determine that match value 190 of "87.5%" is less than threshold 230 of "90%", and in response, may generate requested rendered object 148c, if stored object data 142c is stored in memory 124, by application of requested attribute data 145 to stored object data 142c.

In some examples, when match value 190 corresponding to requested attribute data 145c is less than threshold 230, and stored object data 142c is not stored in memory 124, processor 122 may generate request 180 and may send request 180 to application domain 110. Application processor 112 may then generate requested rendered object 148c and may send requested rendered object 148c to distribution domain 120. In some examples, application processor 112 may generate intermediate rendered object 249c, such as, for example, a lower resolution version of requested rendered object 148c. Generation of intermediate rendered object 249c may include application of a portion of requested attribute data 145c to stored object data 142c. For example, application processor 112 may generate intermediate rendered object 249c such that the value of the member "View" corresponding to intermediate rendered object 249c is "Left", as indicated by requested attribute data 145c. A value of member "Size" corresponding to intermediate rendered object 249c may be "1.0", which may be an original size of an object represented by stored object data 142c, instead of "0.70" indicated by requested attribute data 145c. Application processor 112 may send intermediate rendered object 249c to distribution domain 110.

Processor 122 of distribution domain 110 may receive intermediate rendered object 249c, and may generate requested rendered object 148c such as by application of requested attribute data 145c to intermediate rendered object 249c. In an example, if intermediate rendered object 249c is stored in memory 124, processor 122 may generate requested rendered object 148c with use of intermediate rendered object 249c without a need to send request 180 to application domain 110. In some examples, when match value 190 corresponding to requested attribute data 145c is less than threshold 230, processor 122 may generate requested rendered object 148c by applying requested attribute data 145c to stored rendered object 144c.

In an example, matching instruction 160 may be effective to indicate a sequence to compare values of members in different levels, such as first comparing values of members in second level 220, then comparing values of members in first level 210. Processor 122 may first compare values of members in second level 220 of requested attribute data 145c, with values of members in second level 220 of stored attribute data 143. Processor 122 may determine whether to compare values of members in first level 210 of requested attribute data 145c with values of members in first level 210 of stored attribute data 143, based on the result of the comparison of requested attribute data 145c with stored attribute data 143 at second level 220. In the example, a comparison of values of members in second level 220 of requested attribute data 145c with stored attribute data 143b may indicate that requested attribute data 145c does not match with stored attribute data 143b. Processor 122 may thereafter not compare values in first level 210 of requested attribute data 145c with values in first level 210 of stored attribute data 143b because a lack of matching at second level 220 indicates that stored attribute data 143 will not be able to be used to satisfy a request for requested attribute data 145. A comparison of values of members in second level 220 of requested attribute data 145c with stored attribute data 143c may indicate that requested attribute data 145c matches with stored attribute data 143c. Processor 122 may compare values of members in first level 210 of requested attribute data 145c with values of members in first level 210 of stored attribute data 143c.

In another example, matching instruction 160 may indicate a comparison sequence of first comparing first level 210, then comparing second level 220, and member "View" may be a member of first level 210 instead of second level 220. Processor 122 may first compare values of members in first level 210 of requested attribute data 145b, with values of members in first level 210 of stored attribute data 143. Processor 122 may determine whether to compare values of members in second level 220 of requested attribute data 145b with values of members in second level 220 of stored attribute data 143, based on the comparison of requested attribute data 145b with stored attribute data 143 at first level 210. In the example, a comparison of values of members "ID", "Size", and "View" of requested attribute data 145b with stored attribute data 143b may indicate that requested attribute data 145b matches with stored attribute data 143b. Processor 122 may determine that stored rendered object 144b may be same as requested rendered object 148b, and may not continue to compare values of members in second level 220 of requested attribute data 145b with values of members in second level 220 of stored attribute data 143b.

In another example, matching instruction 160 may indicate a comparison sequence of first comparing first level 210, then comparing second level 220, and member "View" may be a member of first level 210 instead of second level 220. Processor 122 may first compare values of members in first level 210 of requested attribute data 145c, with values of members in first level 210 of stored attribute data 143. Processor 122 may determine whether to compare values of members in second level 220 of requested attribute data 145c with values of members in second level 220 of stored attribute data 143, based on the comparison of requested attribute data 145c with stored attribute data 143 at first level 210. In the example, processor 122 may compare values of members "ID", "Size", and "View" of requested attribute data 145c with stored attribute data 143c. Processor 122 may determine that match value 190 corresponding to the comparison is "87.5%", and may determine that "87.5%" is greater than threshold 130 of "85%". Processor 122, based on match value 190, may determine that stored rendered object 144c may be same as requested rendered object 148c, and may not continue to compare values of members in second level 220 of requested attribute data 145c with values of members in second level 220 of stored attribute data 143c.

Figure 3:
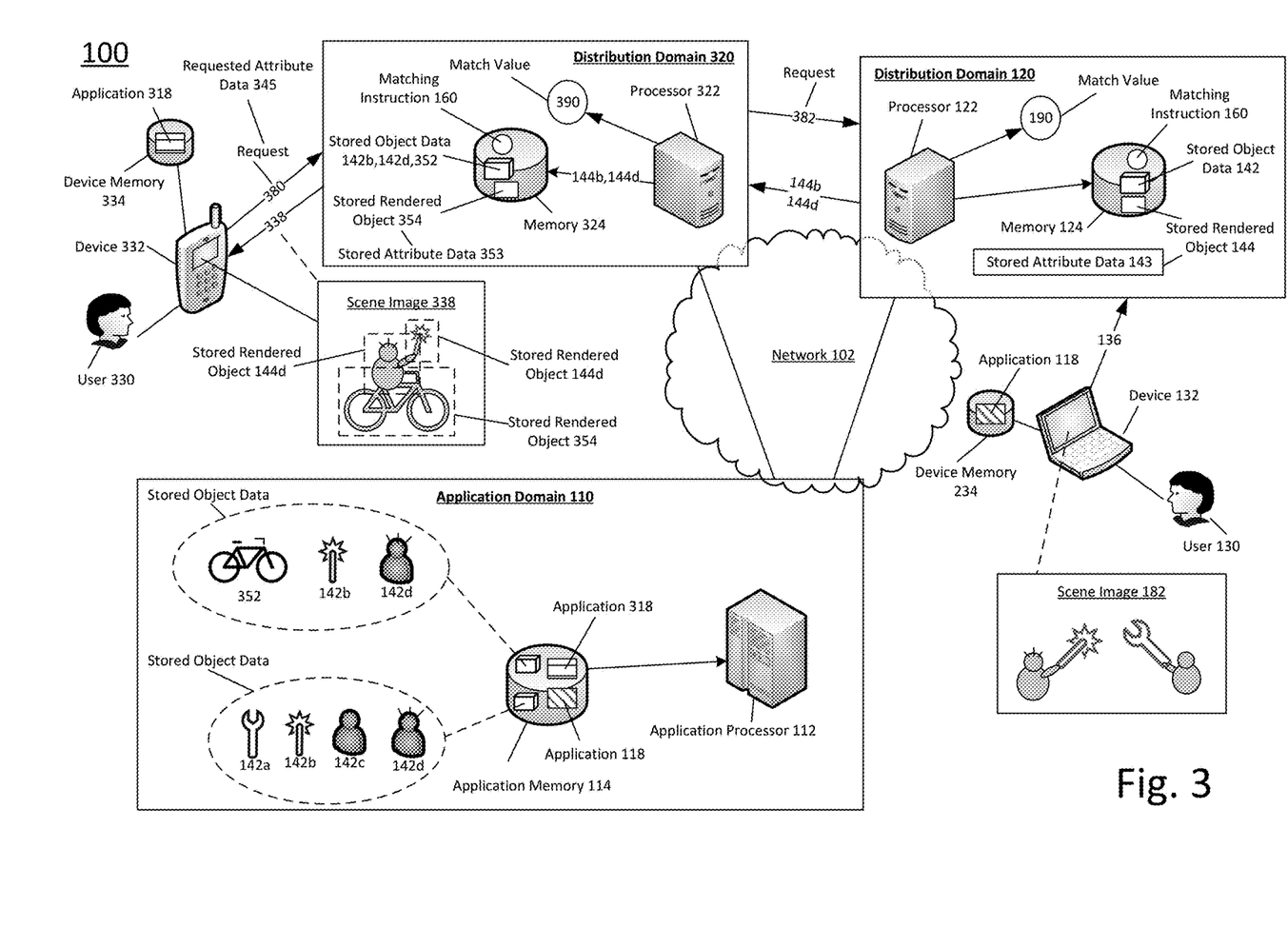
FIG. 3 illustrates the example system of FIG. 1 with additional detail relating to an implementation of a scene image generator with more than one distribution domain.

FIG. 3 illustrates the example system 100 of FIG. 1 with additional detail relating to an implementation of a scene image generator with more than one distribution domain, arranged in accordance with at least some embodiments described herein. FIG. 3 is substantially similar to system 100 of FIG. 1, with additional details. Those components in FIG. 3 that are labeled identically to components of FIG. 1 will not be described again for the purposes of clarity.

In some examples, distribution domain 120 may share stored rendered objects 144 stored in memory 124 with one or more different distribution domains 320. Distribution domain 320 may be configured to be in communication with distribution domain 120 through network 102. Distribution domain 320 may include a processor 322 and/or a memory 324, where processor 322 and memory 324 may include similar functionalities as processor 122 and memory 124 of distribution domain 120. Processor 322 may be configured to execute matching instruction 160, which may be stored in memory 324, to determine a match value 390. In an example, a user 330 may use a device 332 to execute an application 318, which may be different from application 118. In some examples, application 318 and application 118 may each be a different video game. In some examples, application 318 and application 118 may correspond to a same video game, but may each be a different version of the video game. Device 332 may be a cellular phone, a laptop computer, a video game console, etc., which may be configured to be in communication with distribution domain 320 through network 102. Device 332 may include a device memory 334, which may be configured to store application 318. Application memory 114 may be further configured to store application 318.

During execution of application 318 on device 332, device 332 may generate request 380 for a scene image 338 based on an input by user 330. Scene image 338 may include object images which may correspond to stored rendered objects 144b, 144d (stored in memory 124), 354 (stored in memory 324). Request 380 may include requested attribute data 345, which may be effective to describe objects represented by stored object data 142b, 142d, 352 of application 318. Device 332 may send request 380 to distribution domain 320 through network 102. Processor 322 may receive request 380 and in response, may compare requested attribute data 345 with stored attribute data 353 stored in memory 324. Processor 322 may determine match value 390 based on the comparison of requested attribute data 345 with stored attribute data 353. In the example, memory 324 may include stored rendered object 354, but may not include stored rendered object 144b, 144d. Match value 390, determined by processor 322, may indicate a match between requested attribute data 345 with stored attribute data 353 of rendered object 354. Processor 322, based on match value 390, may retrieve rendered object 354 from memory 324. Processor 322, based on match value 390, may further generate request 382 and in response, may send request 382 to distribution domain 120.

Request 382 may be a request for stored rendered objects 144b, 144d, and may include requested attribute data 345 that corresponds to stored rendered objects 144b, 144d. Processor 122 of distribution domain 120 may receive request 382 and in response, may compare requested attribute data 345 with stored attribute data 143 to determine match value 190. In the example, match value 190 may indicate a match between requested attribute data 345 and stored attribute data 143b, 143d stored in memory 124. Processor 122, based on match value 190, may retrieve stored rendered objects 144b, 144d from memory 124 and may send stored rendered objects 144b, 144d to distribution domain 320. Processor 322 of distribution domain 320 may receive stored rendered objects 144b 144d and may store stored rendered objects 144b, 144d in memory 324. Processor 322 may further generate scene image 338 with use of stored rendered objects 144b 144d, 354 and may send scene image 338 to device 332 to be outputted on a display of device 332.

In some examples, matching instruction 160 may include instructions effective to instruct processors of distribution domains to selectively store rendered objects. In an example, matching instruction 160 may instruct processor 122 to store rendered objects based on a frequency of requests for the rendered object. For example, matching instruction 160 may instruct processor 122 to store the top ten most requested rendered objects within the past ten days. Processor 122 may further be configured to remove rendered objects from memory 124 based on matching instruction 160. In another example, matching instruction 160 may instruct processor 122 to store rendered objects based on a data cost to generate the rendered object. A data cost to generate a rendered object may correspond to a file size of the rendered object, a time to generate the rendered object, etc. In an example, matching instruction 160 may instruct processor 122 to store rendered objects which may of a file size larger than 500 megabytes.

Among other possible benefits, a system in accordance with the disclosure may benefit application developers, application distributors, and users of applications. Systems in accordance with the disclosure may provide a more efficient method to generate scene images by reducing a frequency to generate rendered objects in order to generate a scene image. When a rendered object is generated, the rendered object may be stored and may be used to generate different scene images from different applications, such as different games or different versions of games, to reduce the frequency to generate rendered objects. A reduction in generation of rendered objects may utilize less hardware and energy at application distribution data centers. Such a reduction may allow application developers to purchase less equipment or service from application distributors. Such a reduction may allow application distributors to maintain their resources as the reduction of generation of rendered objects may lessen the load on the resources. Users of applications may also benefit from the system by being able to receive a requested application instance in a more efficient manner. A system in accordance with the disclosure may also reduce occurrences of bottlenecks in application domains and may reduce storage of duplicated data.

Figure 4:
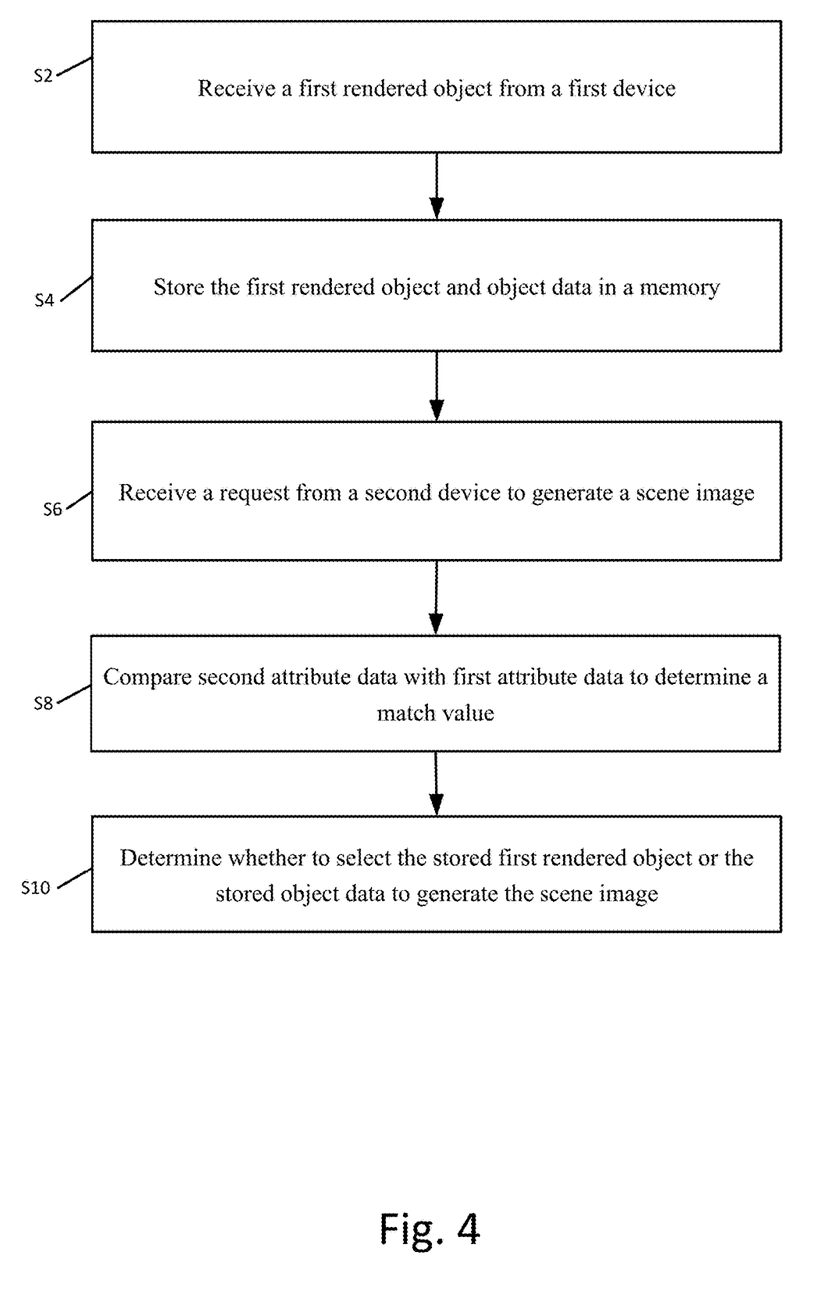
FIG. 4 illustrates a flow diagram for an example process to implement a scene image generator.

FIG. 4 illustrates a flow diagram for an example process to implement a scene image generator, arranged in accordance with at least some embodiments presented herein. The process in FIG. 4 could be implemented using, for example, system 100 discussed above. An example process may include one or more operations, actions, or functions as illustrated by one or more of blocks S2, S4, S6, S8, and/or S10. Although illustrated as discrete blocks, various blocks may be divided into additional blocks, combined into fewer blocks, or eliminated, depending on the desired implementation.

Processing may begin at block S2, "Receive a first rendered object from a first device". At block S2, a processor may receive a first rendered object from a first device. The first rendered object may be based on object data, and may include first attribute data of the object data.

Processing may continue from block S2 to block S4, "Store the first rendered object and object data in a memory". At block S4, the processor may store the first rendered object and the object data in a memory. The memory may be configured to be in communication with the processor. In some examples, the processor may store the first rendered object and the object data based on a frequency of requests for the first rendered object. In some examples, the processor may store the first rendered object and the object data based on a data cost that may be related to generation of the first rendered object.

Processing may continue from block S4 to block S6, "Receive a request from a second device to generate a scene image". At block S6, the processor may receive a request from a second device to generate a scene image. The scene image may include an object image of a second rendered object. The second rendered object may be based on the object data, and may include second attribute data of the object data. In some examples, the request may include an identification of the object data and an indication of the second attribute data.

Processing may continue from block S6 to block S8, "Compare second attribute data with first attribute data to determine a match value". At block S8, the processor may compare the second attribute data with the first attribute data to determine a match value. In some examples, the first attribute data may include a first level and a second level. The first level of the first attribute data may include a first member and a first value of the first member. The second level of the first attribute data may include a second member and a second value of the second member. The second attribute data may include the first level and the second level. The first level of the second attribute data may include the first member and a third value of the first member. The second level of the second attribute data may include the second member and a fourth value of the second member. The processor may compare the second attribute data with the first attribute data by comparing the third value with the first value. The processor may determine whether to compare the fourth value with the second value based on the comparison of the first value with the third value. In some examples, the match value may be based on the comparison of the fourth value with the second value.

Processing may continue from block S8 to block S10, "Determine whether to select the stored first rendered object or the stored object data to generate the scene image". At block S10, the processor may determine whether to select the stored first rendered object or the stored object data to generate the scene image. In some examples, the processor may compare the match value with a threshold. The processor may select the first stored rendered object when the match value is greater than the threshold. The processor may retrieve the second rendered object, or may generate the second rendered object with use of the object data or the first rendered object, when the match value is less than the threshold. The processor may generate the scene image with use of the second rendered object.

Figure 5:
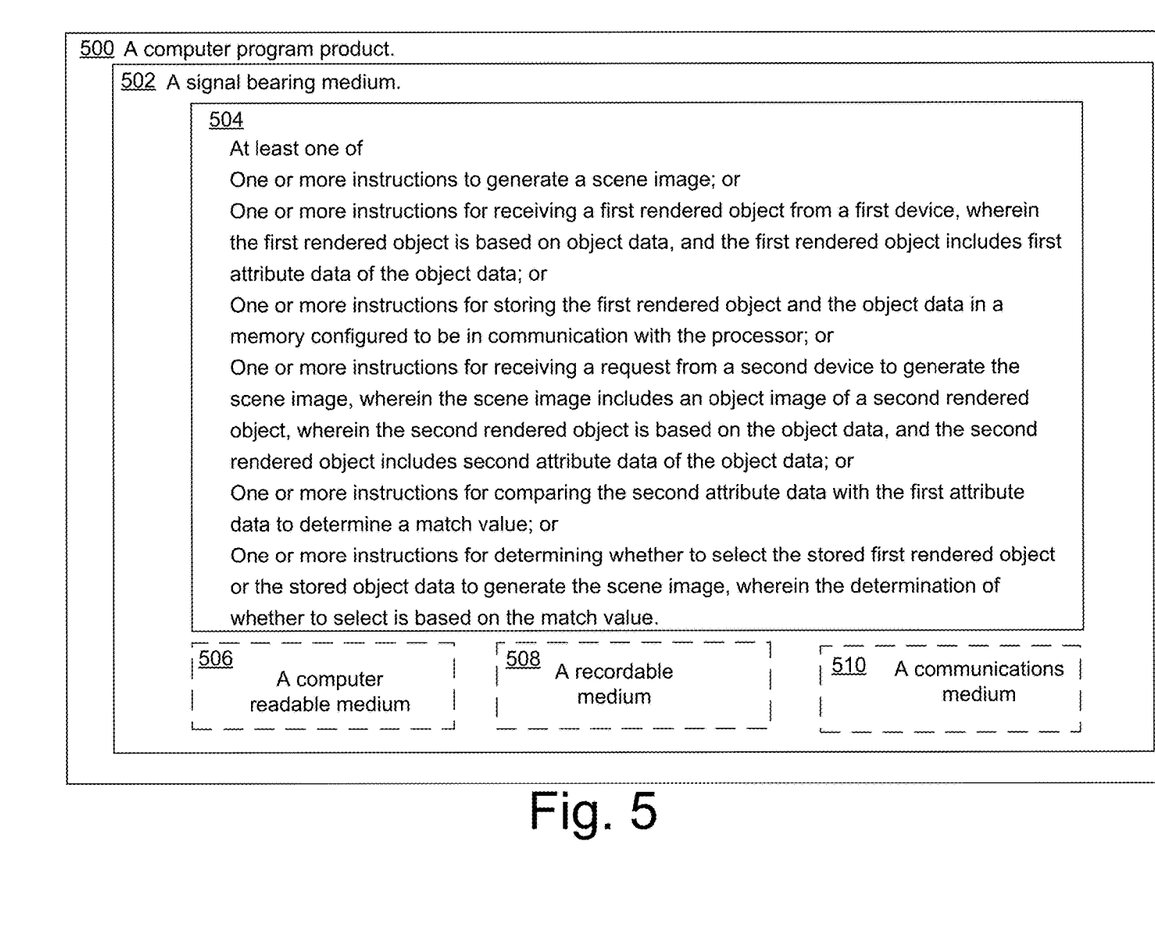
FIG. 5 illustrates an example computer program product that can be utilized to implement a scene image generator.

FIG. 5 illustrates an example computer program product that can be utilized to implement a scene image generator, arranged in accordance with at least some embodiments described herein. Program product 500 may include a signal bearing medium 502. Signal bearing medium 502 may include one or more instructions 504 that, when executed by, for example, a processor, may provide the functionality described above with respect to FIGS. 1-4. Thus, for example, referring to system 100, processor 122 may undertake one or more of the blocks shown in FIG. 5 in response to instructions 504 conveyed to the system 100 by signal bearing medium 502.

In some implementations, signal bearing medium 502 may encompass a computer-readable medium 506, such as, bur not limited to, a hard disk drive (HDD), a Compact Disc (CD), a Digital Versatile Disc (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communication link, a wireless communication link, etc.). Thus, for example, program product 500 may be conveyed to one or more modules of the system 100 by an RF signal bearing medium 502, where the signal bearing medium 502 is conveyed by a wireless communications medium 510 (e.g., a wireless communications medium conforming with the IEEE 802.11 standard).

Figure 6:
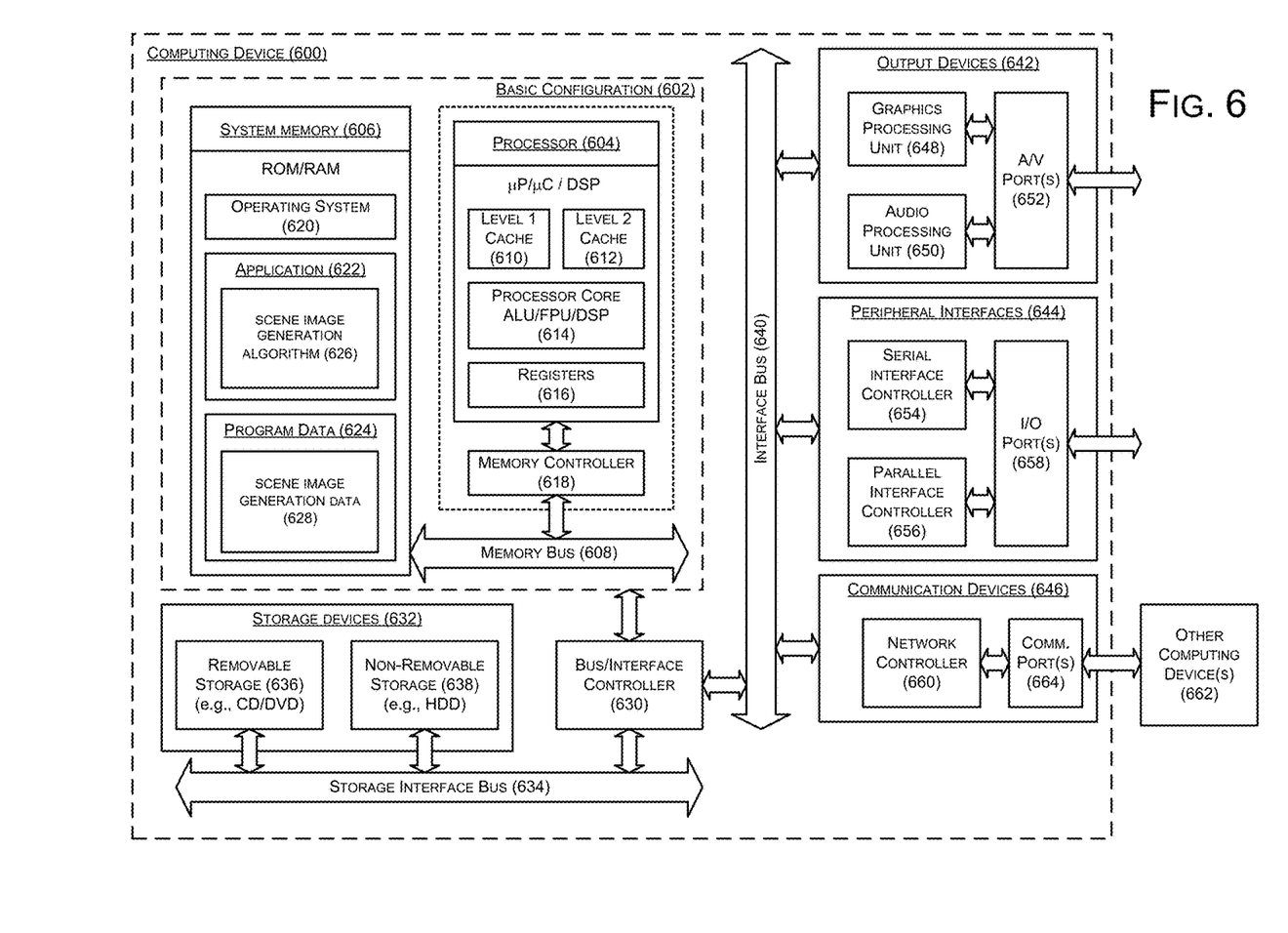
FIG. 6 is a block diagram illustrating an example computing device that is arranged to implement a scene image generator, all arranged according to at least some embodiments described herein.

FIG. 6 is a block diagram illustrating an example computing device that is arranged to implement a scene image generator, arranged in accordance with at least some embodiments described herein. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), microcontroller (µC) a digital signal processor (DSP), or any combination thereof. Processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations, memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include a scene image generation algorithm 626 that is arranged to perform the functions as described herein including those described with respect to system 100 of FIGS. 1-5. Program data 624 may include scene image generation data 628 that may be useful for implementation of a scene image generator as is described herein. In some embodiments, application 622 may be arranged to operate with program data 624 on operating system 620 such that implementations of the scene image generator may be provided. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDDs), optical disk drives such as compact disc (CD) drives or digital versatile disc (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile discs (DVDs) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will also be understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc," is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to generate a scene image, the method comprising, by a processor:
   receiving a first rendered object from a first device, wherein the first rendered object is based on object data, and the first rendered object includes first attribute data, and wherein the first attribute data is effective to represent at least one particular attribute of the first rendered object represented by the object data;
   storing the first rendered object and the object data in a memory configured to be in communication with the processor;
   receiving a request from a second device to generate the scene image, wherein the scene image includes an object image of a second rendered object, the second rendered object is based on the object data, and the second rendered object includes second attribute data, and wherein the second attribute data is effective to represent at least one other particular attribute of the second rendered object represented by the object data;
   comparing the second attribute data with the first attribute data to determine a match value;
   comparing the match value with a threshold;
   determining whether to select the stored first rendered object or the stored object data to generate the scene image, wherein the determination of whether to select is based on the comparison of the match value with the threshold; and
   generating the second rendered object with use of the stored first rendered object when the match value is less than the threshold.

2. The method of claim 1, wherein the request includes an identification of the object data and an indication of the second attribute data.

3. The method of claim 1, wherein determining whether to select further includes selecting the stored first rendered object when the match value is greater than the threshold.

4. The method of claim 1, wherein:
   the first attribute data includes a first level and a second level, the first level includes a first member and a first value of the first member, the second level includes a second member and a second value of the second member,
   the second attribute data includes the first level and the second level, the first level includes the first member and a third value of the first member, the second level includes the second member and a fourth value of the second member, and
   comparing the second attribute data with the first attribute data includes comparing the third value with the first value.

5. The method of claim 4, wherein the match value is a first match value, and the method further comprises:
   determining a second match value based on the comparison of the third value with the first value; and
   determining whether to compare the fourth value with the second value, wherein the determination of whether to compare the fourth value with the second value is based on the second match value.

6. The method of claim 5, wherein determining whether to compare the fourth value with the second value includes comparing the second match value with a first threshold associated with the first level, and the method further comprises comparing the fourth value with the second value when the second match value is greater than the first threshold, and wherein the determination of the first match value is based on the comparison of the fourth value with the second value.

7. The method of claim 1, wherein storing the first rendered object and the object data is performed in response to determining a frequency of requests for the first rendered object.

8. The method of claim 1, wherein storing the first rendered object and the object data is performed in response to determining a data cost related to generation of the first rendered object.

9. A system effective to generate a scene image, the system comprising:
   a memory configured to store an instruction; and
   a processor configured to be in communication with the memory, the processor being configured to:
      receive a first rendered object from a first device, wherein the first rendered object is based on object data, and the first rendered object includes first attribute data, and wherein the first attribute data is effective to represent at least one particular attribute of the first rendered object represented by the object data;
      store the first rendered object and the object data in the memory;
      receive a request from a second device to generate the scene image, wherein the scene image includes an object image of a second rendered object, the second rendered object is based on the object data, and the second rendered object includes second attribute data, and wherein the second attribute data is effective to represent at least one other particular attribute of the second rendered object represented by the object data;
      in response to receipt of the request, execute the instruction stored in the memory to:

compare the second attribute data with the first attribute data;

determine a match value between the first attribute data and the second attribute data based on the comparison;

compare the match value with a threshold;

determine whether to select the stored first rendered object or the stored object data to generate the scene image, wherein the determination of whether to select is based on the comparison of the match value with the threshold; and generate the second rendered object with use of the stored first rendered object when the match value is less than the threshold.

10. The system of claim 9, wherein the processor is further configured to execute the instruction to select the stored first rendered object when the match value is greater than the threshold.

11. The system of claim 9, wherein the processor is further configured to output the scene image to a display of the second device.

12. A system effective to generate a scene image, the system comprising:

a memory configured to store an instruction;

a first processor configured to be in communication with the memory, the first processor being configured to:

generate a first rendered object, wherein the first rendered object is based on object data, and the first rendered object includes first attribute data, and wherein the first attribute data is effective to represent at least one particular attribute of the first rendered object represented by the object data; and store the first rendered object and the object data in the memory; and a second processor configured to be in communication with the memory and the first processor, the second processor being configured to:

receive a request from a device to generate the scene image, wherein the scene image includes an object image of a second rendered object, the second rendered object is based on the object data, and the second rendered object includes second attribute data, and wherein the second attribute data is effective to represent at least one other particular attribute of the second rendered object represented by the object data;

in response to receipt of the request, execute the instruction stored in the memory to:

compare the second attribute data with the first attribute data;

determine a match value between the first attribute data and the second attribute data based on the comparison;

compare the match value with a threshold;

determine whether to select the stored first rendered object or the stored object data to generate the scene image, wherein the determination of whether to select is based on the comparison of the match value with the threshold; and generate the second rendered object with use of the stored first rendered object when the match value is less than the threshold.

13. The system of claim 12, wherein the second processor is further configured to output the scene image to a display of the device.

14. The system of claim 12, wherein the second processor is further configured to execute the instruction to select the stored first rendered object when the match value is greater than the threshold.

15. The system of claim 12, wherein the second processor is further configured to generate the scene image with use of the second rendered object.

16. The system of claim 12, wherein the first processor is further configured to:

generate the second rendered object; and store the second rendered object in the memory.

* * * * *

UNITED STATES PATENT AND TRADEMARK OFFICE
CERTIFICATE OF CORRECTION

PATENT NO. : 9,761,030 B2
APPLICATION NO. : 14/767165
DATED : September 12, 2017
INVENTOR(S) : Xu et al.

It is certified that error appears in the above-identified patent and that said Letters Patent is hereby corrected as shown below:

On the Title Page

In Item (73), under "Assignee", in Column 1, Lines 1-3, delete "EMPIRE TECHNOLOGY DEVELOPMENT LLC, Wilmington CT (US)" and insert -- EMPIRE TECHNOLOGY DEVELOPMENT LLC, Wilmington, DE (US) --, therefor.

In the Specification

In Column 3, Line 28, delete "receive first" and insert -- receive a first --, therefor.

In Column 7, Line 55, delete "249c without" and insert -- 249c, without --, therefor.

In Column 12, Line 3, delete "bur not" and insert -- but not --, therefor.

Signed and Sealed this
Twelfth Day of December, 2017

Joseph Matal
*Performing the Functions and Duties of the
Under Secretary of Commerce for Intellectual Property and
Director of the United States Patent and Trademark Office*